Patented Apr. 20, 1926.

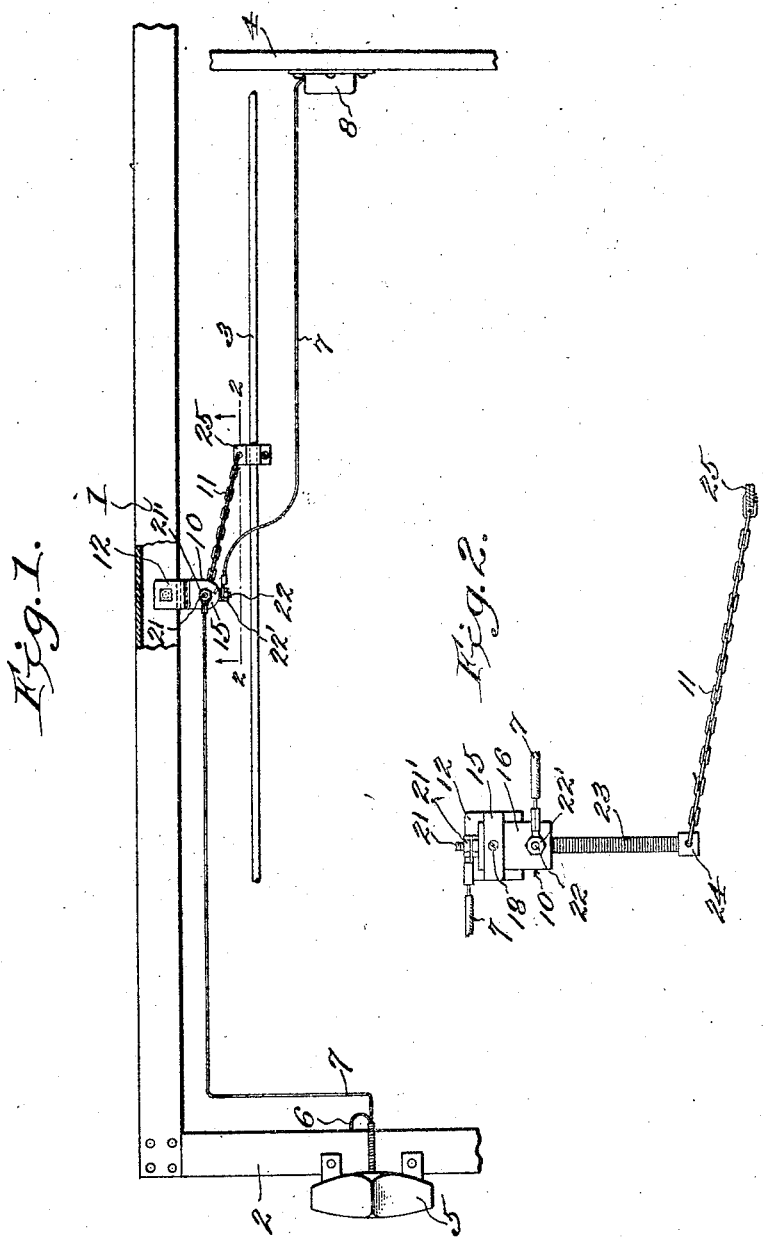

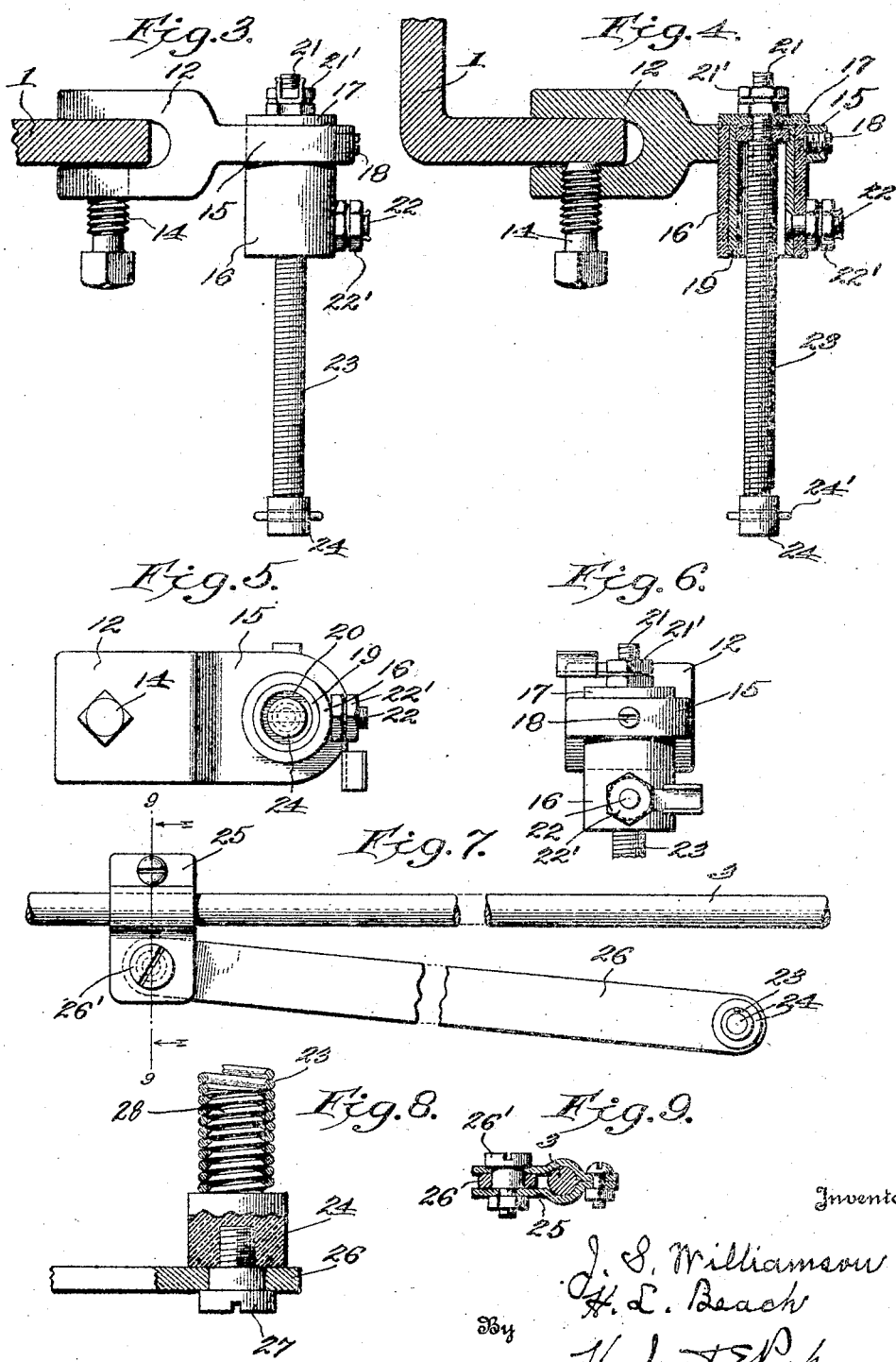

1,581,149

UNITED STATES PATENT OFFICE.

JOHN S. WILLIAMSON AND HERBERT L. BEACH, OF BALTIMORE, MARYLAND, ASSIGNORS, BY DIRECT AND MESNE ASSIGNMENTS, TO SIDNEY L. DAVIS RECEIVER FOR MORGAN MANUFACTURING COMPANY, INC., OF KEENE, NEW HAMPSHIRE.

CONTROL SWITCH FOR VEHICLE SIGNALS.

Application filed May 1, 1924. Serial No. 710,269.

*To all whom it may concern:*

Be it known that we, JOHN S. WILLIAMSON and HERBERT L. BEACH, both citizens of the United States of America, and residents of the city of Baltimore, State of Maryland, have invented certain new and useful Improvements in and Relating to Control Switches for Vehicle Signals, of which the following is a specification.

The control switch of the invention is shown and is particularly adapted for use in connection with stop signals for vehicles, particularly motor vehicles, as automobiles, trucks, motorcycles and the like. Such stop signals are well known and need not be described.

The control switch or circuit maker and breaker for such a signal is generally mounted on the exterior of the machine beneath the body and adjacent a service break operating rod with which it is connected and by or through which it is actuated. The position of the switch or circuit maker and breaker on the exterior of the machine, particularly beneath the body, exposes it under service conditions to the action of dirt, water, grease and other foreign matter. These conditions frequently cause failure of the switch to operate the signal, so that it is not positive and dependable in operation, particularly after the switch has been in use for a sufficient period for the accumulation of a considerable deposit of foreign matter, and after it has become worn and possibly a bit out of alignment, which latter frequently occurs during use and is often an initial condition due to hurried and unskillful installation.

The invention is directed at the production of a switch and mounting therefor which need not be carefully aligned and can be installed without the aid of a skilled mechanic and the installation of which does not involve cutting or boring the frame to which it is secured, the mounting being at the same time rigid and dependable and capable of installation in the minimum of time without the use of special tools.

The invention also relates to the production of a switch which is positive and reliable in operation under all conditions and over the complete range of operation of the brake, so as to cause operation of the signal whenever the brake is applied or attempted to be applied in any way.

In the accompanying drawing we have illustrated such a switch in connection with a stop signal to which it is operatively connected.

In the drawings—

Figure 1 is a more or less diagrammatic view in top plan of portions of the chassis frame and service brake mechanism of an automobile, with the control switch and mounting of the invention installed thereon in operative electrical connection with a "stop" signal light.

Figure 2 is a view in side elevation of the control switch and operating connection therefor with a brake rod, taken as on the line 2—2 of Figure 1.

Figure 3 is a side elevation of a control switch of the invention and mount therefor forming a unit therewith, attached in position on the chassis frame of an automobile a portion of the frame being shown in vertical section.

Figure 4 is a vertical longitudinal section through the control switch and mounting of Figure 3, with the movable resilient contact element thereof in elevation.

Figure 5 is a plan view or elevation of the movable and fixed contact element side or end of the switch and mounting therefor.

Figure 6 is an elevation of the switch and mounting on the side thereof opposite the attaching portion of the mounting.

Figure 7 is a detail plan view showing a modified form of operating connection between the switch and brake rod of an automobile, a portion only of the brake rod being shown.

Figure 8 is a detail sectional view of one manner of attaching the connecting link of Figure 7 to the movable contact element of the switch.

Figure 9 is a detail sectional view taken on the line 9—9 of Figure 7.

Referring to the drawings by numerals, the illustration Figure 1 shows a longitudinal frame member 1 of a vehicle chassis, rear cross beam 2, service brake rod 3 and instrument board 4, and a stop signal light 5 attached to the rear beam 2 or at any preferred point on the vehicle where it may be seen from the rear. The signal light 5 is connected to the electric system of the vehicle by wires 6, 7, which circuit, as shown, includes an ammeter or other instrument 8 and a switch member 10 attached to the beam 1 by a support 12 to be described. The switch is connected for operation by means of a chain 11 to the brake rod 3, which for this purpose carries a clip 25 to which the chain 11 is attached.

The support 12, illustrated, is in the form of a U-shaped jaw member which takes over and straddles the edge or flange of the frame as shown in Fig. 3, one leg of the U being provided with a tapped hole at right angles to the length of the leg in which is seated a cap screw 14 which when tightened engages the flange of the frame 1 and causes the support to grip the frame, the support being as previously specified permanently and firmly attached the frame with out the necessity for skilled labor or the use of special tools, and without boring or cutting the frame whereby the latter might be weakened to a sufficient degree to cause possible failure or distortion.

The support 12 as shown has a base 15 extending oppositely to the legs from the closed side of the U, which base is apertured as shown in Figure 4 to receive the switch 10 which comprises an insulating casing or shell 16 in the form of a thimble having the closed end upward, the base 15 being preferably installed in horizontal position. This thimble is held in the base by a set screw 18 and the closed upper end 17 of the shell is centrally apertured to pass the threaded reduced end of a stud 21 which is held in position by nuts 21' screwed down against the upper surface of the top portion 17 of the insulating block. The upper end of these nuts may be used as an attaching means for the usual type of connection or any preferred connection. The stud 21 is inserted by threading through the block from the inside and projects downwardly into the inside of the member 16, and serves as a support for the contact member 23 of the switch, which member as shown is in the form of a tightly coiled helical wire spring, the coils of the spring being, however, in the form shown in close contact, though this is not an essential feature of the device. The spring may be attached to the stud 21 by soldering or in any suitable and preferred manner. The other contact member of the switch is shown in the form of a brass sleeve 19 which is snugly seated in the shell or casing 16 and encircles the contact member 23, being normally spaced away from the latter by a slight interval sufficient to prevent contact by accumulation of dirt and to prevent accidental contact, but not sufficient to prevent easy and convenient closing of the switch by the slightest pressure on the brake. Means is provided for connecting the contact member 19 to the electric system by a screw 22 having its head seated in the sleeve 19 and projecting outwardly through the insulating casing 16 and having nuts 22' affixed to the outer end, the preferred method of attaching the wire being by placing the usual connection between the two nuts, the outer one being tightened up against the inner nut in a well-known manner which requires no specific description.

At the free or swinging end of the contact or spring member 23 I have shown attaching means for a chain or other suitable actuating member 11, the same being indicated by reference character 24, and as any preferred attaching means may be used, no specific description of this feature is thought to be necessary. The chain is insulated.

Figures 7, 8 and 9 show a modified form of actuating means for connecting the switch to the brake rod 3 whereby all lost motion is eliminated and whereby the switch may be actuated either by thrust or pull which gives a greater latitude in selecting the position of the switch. This consists of a rigid connecting rod 26. The connecting rod is provided at one end with a pin 26' which may be connected at will by means of clip 25 to the rod 3 in an obvious manner, which will be clearly understood from the illustration and need not be described. This connection may be made to any point in the brake rod. The actuating rod or connecting rod 26 has a bearing at the other end on a shouldered stud or pin 27 which has an enlarged head outside the rod and a screw-threaded reduced portion on the opposite side of the rod, which screw portion is seated in a block 24 of insulating material having a screw-threaded shank 28 which is engaged with the helical spring contact arm 23 at the free end thereof, the shank being screwed into the central aperture in the spring in an obvious manner as illustrated in Figure 7. The manner of actuating or closing the switch in signalling, i. e., illuminating the stop light, will be easily understood. Any lateral pull or thrust on the contact arm 23 at the free end thereof brings it in contact with the second contact member or sleeve 19, closing the circuit. The necessary lateral thrust or pull is applied by means of the connecting rod 26 or the chain 11, whenever the brake is applied, the release of the brake permitting the contact arm by its own resiliency and in the case of the arm 26 with the assistance of the brake spring, to return to normal position out of contact as shown in Fig. 4. The advantages of the structure consisting of protection from accumulation of dirt, avoidance of the necessity for alignment, convenience of installation without special tools and without boring or slotting the frame, universal action and absolute dependability have been fully discussed in the preamble.

I have thus described specifically and in detail a switch embodying the features of my invention in order that the nature and operation of the same may be clearly understood; however, the specific terms herein are used descriptively rather than in a limiting sense, the scope of the invention being defined in the claims.

What we claim and desire to secure by Letters Patent is:

1. A stop light switch for road vehicles comprising an apertured support, a sleeve of insulating material mounted in the aperture, a tubular contact member of conducting material mounted in the sleeve, a flexible contact member rigidly mounted in one end of the sleeve and insulated therefrom and extending through the sleeve from which it is spaced and having a free end extending beyond the sleeve, means for connecting the free end of the sleeve to the brake mechanism of a vehicle and electrical connecting means for the respective contact members.

2. A stop light switch for road vehicles comprising an apertured support, a sleeve of insulating material mounted in the aperture, a tubular contact member of conducting material mounted in the sleeve, a flexible contact member rigidly mounted in one end of the sleeve and insulated therefrom and extending through the sleeve from which it is spaced and having a free end extending beyond the sleeve, means for connecting the free end of the sleeve to the brake mechanism of a vehicle and electrical connecting means for the respective contact members, the support comprising spaced jaws to take over a vehicle frame and a screw in one of said jaws to clamp the same.

3. A stop light switch for motor vehicles comprising a tubular contact member, a resilient contact member mounted centrally of the tube and substantially parallel to the axis, means for connecting one end of the flexible contact member to a vehicle brake actuating means whereby the flexible member is deflected into contact with the tubular member when the brake is applied.

4. A stop light switch for road vehicles comprising a hollow contact member, a resilient contact member mounted in the hollow member and projecting therefrom and spaced away from the hollow member, means insulating the flexible contact member from the hollow member, means for connecting the projecting end of the flexible contact member to a brake whereby the flexible member is deflected into contact with the hollow member when the brake is applied, the switch having a support with a U shaped portion to engage the frame of the machine and a screw threaded into one leg of the U shaped portion to engage the flange.

5. A stop light switch for road vehicles comprising an apertured support, a sleeve of insulating material mounted in the aperture, a tubular contact member of conducting material mounted in the sleeve, a flexible contact member rigidly mounted in one end of the sleeve and insulated therefrom and extending through the sleeve from which it is spaced and having a free end extending beyond the sleeve, means for connecting the free end of the flexible contact member to the brake mechanism of a vehicle and electrical connecting means for the respective contact members, the flexible contact member being in the form of a helical spring.

6. In a stop light switch, a support, a tubular contact member, a flexible contact member inside the tubular member and projecting therefrom, a threaded member extending inside the flexible member secured to the support and supporting said flexible member, and means connecting the projecting end of the flexible member to a brake whereby the flexible member is deflected into contact with the tubular member when the brake is applied.

7. In a stop light switch, a support, a tubular contact member, a flexible contact member inside the tubular member and projecting therefrom and spaced away from the same, a threaded member secured to the support and extending inside the flexible member and supporting said flexible member, and means connecting the projecting end of the flexible member to a brake whereby the flexible member is deflected into contact with the tubular member when the brake is applied, means insulating one of said members from the frame and means insulating the flexible member from the tubular member.

8. In a stop light switch, a support, a flexible contact member secured to the support and projecting therefrom, a casing insulated from the contact member enclosing the contact member and having an opening from which the contact member projects permitting the flexible member to be freely flexed relatively to the casing, a second contact member inside the casing and means connecting the projecting end of the flexible member to a brake whereby the flexible member is deflected into contact with the other contact member when the brake is applied.

9. In a stop light switch for road vehicles comprising a support, an elongated flexible contact member secured to the support at one end and projecting therefrom, means insulating the flexible member from the support, a second contact member having an aperture through which the flexible contact member projects and from which it is normally spaced so that contact may be made by flexing the flexible member in any direction, an insulating casing enclosing the second contact member and protecting both contact members from accumulation of foreign matter and means connecting the projecting end of the flexible member to a brake whereby it is deflected into contact with the other contact member when the brake is applied.

Signed at Baltimore, Maryland, this 25th day of April, 1924.

JOHN S. WILLIAMSON.
HERBERT L. BEACH.